(12) United States Patent
Chung

(10) Patent No.: US 6,185,475 B1
(45) Date of Patent: Feb. 6, 2001

(54) METHOD FOR MANUFACTURING JACQUARD WITH COLORED IMAGE

(75) Inventor: Jih-Lung Chung, Chung Ho (TW)

(73) Assignee: Sumagh Textile Company Limited, Taipei (TW)

( * ) Notice: Under 35 U.S.C. 154(b), the term of this patent shall be extended for 0 days.

(21) Appl. No.: 09/114,926

(22) Filed: Jul. 14, 1998

(51) Int. Cl.[7] ....................... G06F 19/00
(52) U.S. Cl. ............ 700/131; 700/132; 700/133; 700/137; 700/138; 700/141; 700/142; 139/11; 139/20; 139/85; 139/455; 139/384 R; 28/141; 28/160
(58) Field of Search ................. 700/130, 131, 700/132, 133, 137, 138, 141, 142; 139/11, 20–21, 85, 455, 46, 48, 384 R; 28/141, 160

(56) References Cited

U.S. PATENT DOCUMENTS

| | | | |
|---|---|---|---|
| 4,172,475 | * 10/1979 | Schwartz et al. | 139/60 R |
| 4,958,664 | * 9/1990 | Oppl et al. | 139/435.1 |
| 5,386,854 | * 2/1995 | Hacker | 139/85 |
| 5,582,213 | * 12/1996 | Okawa | 139/46 |
| 5,678,612 | * 10/1997 | Derudder et al. | 129/657 |
| 5,755,267 | * 5/1998 | Eberhard et al. | 139/1 E |
| 5,794,665 | * 8/1998 | Keim | 139/455 |

* cited by examiner

Primary Examiner—Paul P. Gordon
Assistant Examiner—Ramesh Patel
(74) Attorney, Agent, or Firm—Rosenberg, Klein & Lee

(57) ABSTRACT

The method for manufacturing jacquard with colored image is disclosed, wherein the basic color printing theory in the printing technical is employed in the weaving of jacquard so that jacquard also has image with different gray levels by the same basic colors. Meanwhile, because of the increase number of the gray levels and the range, jacquard having the effect of colored photograph may be manufactured.

2 Claims, 2 Drawing Sheets

METHOD FOR MANUFACTURING JACQUARD WITH COLORED IMAGE

BACKGROUND OF THE INVENTION

Because of the progress in technology, the weave technical has also been improved continuously. Thus people not only pay attention to the material and type of the clothes, but also requires the quality of the image and characters on the clothes.

However, since the recent printing, dying and finishing technologies are also improved greatly, in the prior art, the images on the clothes are also completed by the technologies. However, since the image or characters on the clothes printed by conventional technology is easy to drop or fade, people are not like very much.

However, the generally used cloth are not easy to weave the required image and colors, since the process is complicated and need to waste much time. In manufacturing, the colored yarn must be dyed, it is expensive and time-wasted. While the colored yarn has not limited colors, thus the color channels on the image are also limited, it only can be used to present some simple figure, such as cartoon character. However, the gray levels required by an photograph image can not be presented. Thus, in prior art, only jacquard of single color (black and white) may be woven.

SUMMARY OF THE INVENTION

Accordingly, the object of the present invention is to provide a method for manufacturing jacquard with colored image for overcoming the hindered in the prior art in which the manufactured image jacquard only has unique color. In the present invention, because of the increase of the number of gray levels and colors, jacquard with image quality closing photograph effect may be woven.

The present invention provide a method for manufacturing jacquard with colored image, comprising the steps of: selecting the requiring figure; and then inputting to a computer through a scanner or a digital camera; separating said figure into different basic colors so to form a plurality of gray level figures; inducing similar gray level color numbers from said gray level figures; forming a plurality of structure figures by said gray level numbers according to the depth of color of satin; combining a complete structure figure a shuttle by a shuttle according to the structure figure of the basic colors and the arranging order of the wefts with basic colors; weaving the cloth by jacquard weaving machine according to the complete structure figure, in which the color of weft is one of the basic colors and the color of the warp is white. Thus, jacquard with a colored image is formed.

BRIEF DESCRIPTION OF THE DRAWINGS

The present invention will be better understood and its numerous objects and advantages will become apparent to those skilled in the art by referencing to the following drawings in which.

DESCRIPTION OF THE PREFERRED EMBODIMENT

The present invention is described with referring to appended figures. In different figures, the same components have the same reference number.

Figure 1:
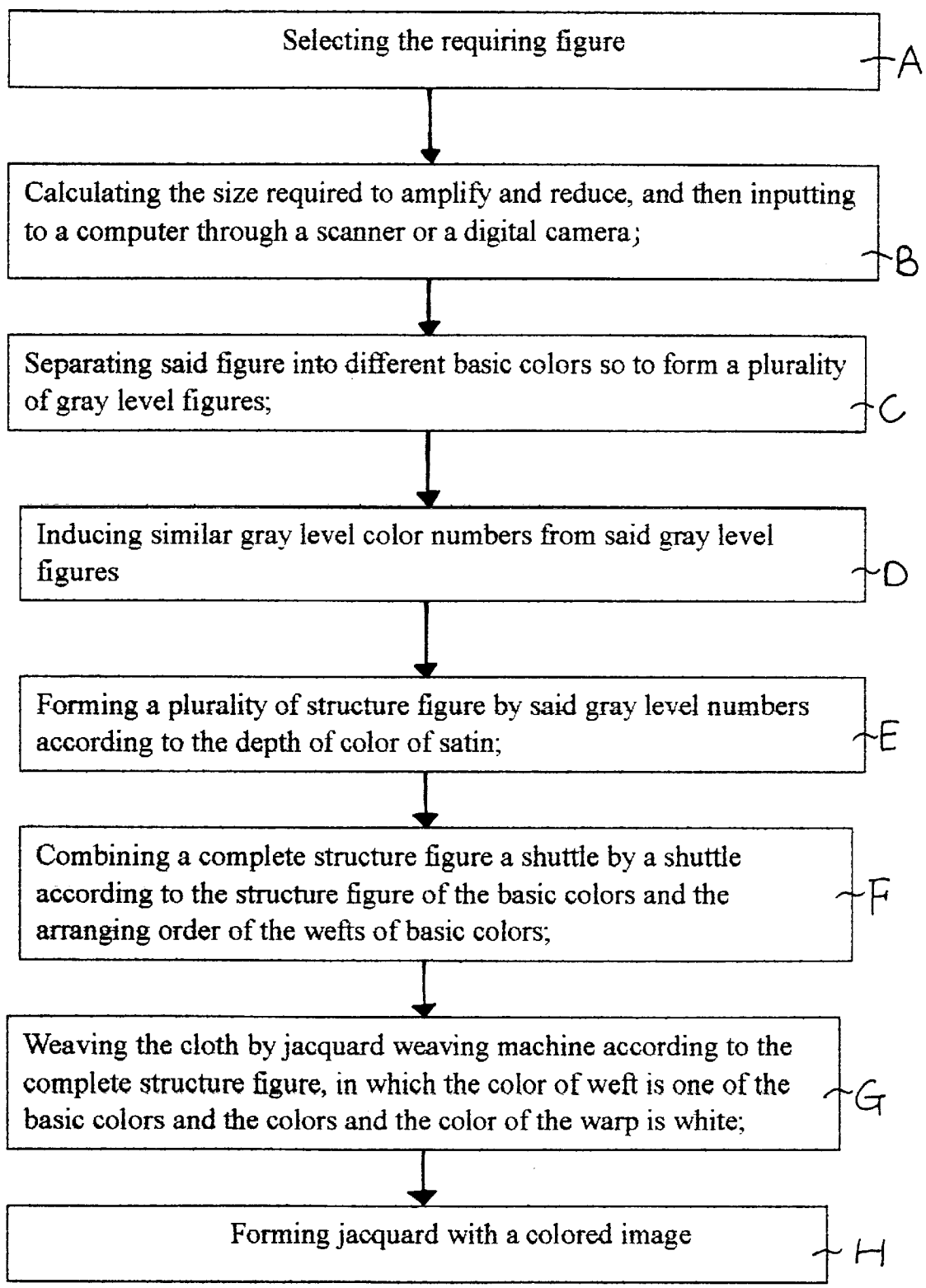
FIG. 1 shows the flow diagram of the manufacturing process of the present invention.
Figure 2:
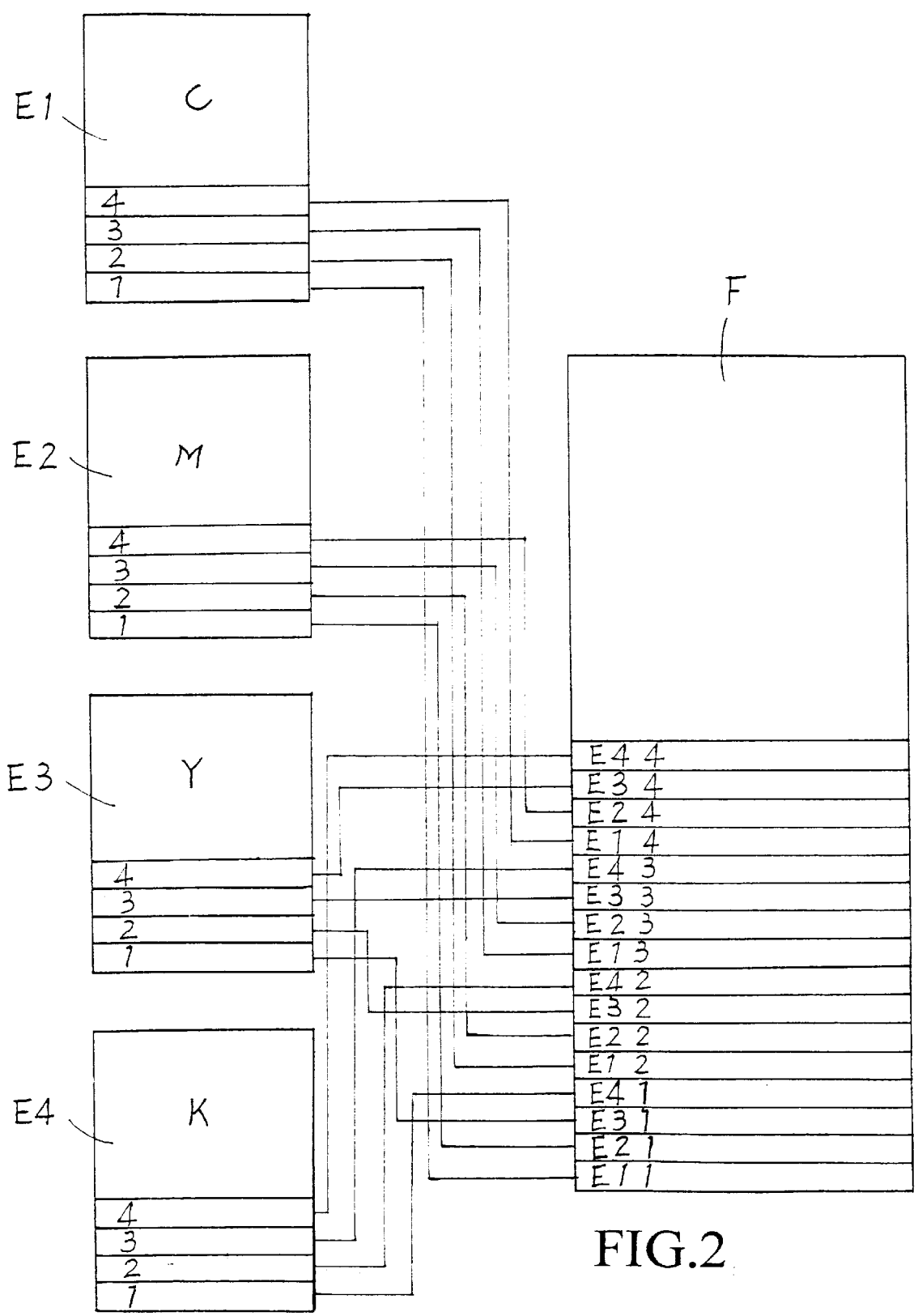
FIG. 2 shows the process that the all of the basic colors are filled into another structure according to the satin of the original figure so as to form a complete structure figure.

The technical steps may be understand with referring to FIG. 1. At first, the required pattern is selected (step A). The size and ratio of colored image or colored photograph is previously calculated (step B). Next, Said image or photograph is inputted to a computer through a scanner or a digital camera, and the basic colors of the original figure is separated within the computer, such as a color separator in printing. Therefore, the figure is separated into a plurality of gray level figures with different colors (step C). Then in the gray level figures, the similar colors are classified to form the required gray level color numbers according to the depth of the color of a satin (step D). Next, the gray level figure is filled into the satin structure according to the gray level color numbers to form a plurality of structure figures (step F), as shown in FIG. 2.

In the embodiment of the present invention, four colors C, M, Y, K (yellow, white, blue, and black) are used as the basic colors, wherein in above step (E), the four sheets of structure figure, (E1), (E2), (E3), and (E4) are generated. Next, according to the structure figure of the basic colors and the arranging order of the wefts of basic colors, a complete structure figure is compounded a shuttle by a shuttle (step F). Next, the jacquard weaving machine will weave the required jacquard according to the complete structure figure (step G). Therefore, the jacquard with colored image effect is manufactured.

In the following, the steps of (E), (F), (G) and (H) and the structure of jacquard are further described.

In the general, the cloth are manufactured by interleaved wefts and warps. While in the jacquard, the wefts with required color are woven on the warps according to the needle number with required length. Thus, one shuttle by one shuttle, the cloth surface will present the color of the wefts and the predetermined figure are completed. However, in the present invention, this method is combined with the printing technology. When the aforementioned steps (A), (B), (C), and (D) have been completed, the computer may calculate the ratio that the weft should be over the warp according gray level basic color (for example, the ratio is 70%, then seven lines of weft is woven above, while three lines of warp are below). If it is required to mix colors, from the above description, it is appreciated that according to the structure figure of the basic colors and the arranging order of the wefts of basic colors, a complete structure figure is compounded a shuttle by a shuttle, as shown in FIG. 2, since the density of weave is large, therefore, when several basic colors are mixed with a fixed ratio, it will generate a color mixing effect in the human vision as the result of the printing theory. In this method, the basic color are formed as a plurality of structure figures according to the structure of the satin, and the figures are combined to form a complete structure figure. Then the jacquard weaving machine may weave jacquard with colored image effect according to said complete structure figure.

Another, in order not to effect the structure of the cloth, in the embodiment of the present invention, if the range of the basic color is too large so that the line numbers of the weft that locates over the warp is too larger than that of the wrap, then it is designed that in a proper distance, one line of warp will be over the weft. Therefore, not only the structure of the cloth will not been destroyed, but also it is not sensed by human vision.

Moreover, the four basic colors, CMYK, used in the embodiment is only as an example. By different arrangements and the orders, the four colors (yellow, white, blue, and black) may generate 22 kinds of gray levels, i.e. by the density and arrangement of the wefts, the mixed colors effect will present. Of course, other then the aforementioned basic colors, another basic colors, for example, RGB, CMY, etc. may be used for printing different colored image with different gray level range.

In summary, in the present invention, the printing technology and the theory of the basic color is used, the image is inputted into computer through a scanner or a digital camera, then the jacquard weaving machine will weave the various cloths with different gray levels. In consequence, the effect very similar a colored photograph is generated.

Those skilled in the art will readily recognize various modifications and changes which may be made to the present invention without strictly following the exemplary embodiment and application illustrated and described herein, and without departing from the true spirit and scope of the present invention which is set forth in the following claims.

What is claimed is:

1. A method for manufacturing jacquard with colored image, comprising the steps of:

(A) selecting the requiring figure;

(B) calculating the sizes required to amplify and reduce, and then inputting the calculated results to a computer through a scanner or a digital camera;

(C) separating said figure into different basic colors so to form a plurality of gray level figures;

(D) deriving similar gray level color numbers from said gray level figures;

(E) forming a plurality of structure figure by said gray level numbers according to the depth of color of satin;

(F) combining a complete structure figure a shuttle by a shuttle according to the structure figure of the basic colors and the arranging order of the wefts with basic colors;

(G) weaving the cloth by jacquard weaving machine according to the complete structure figure, in which the color of weft is one of the basic colors and the color of the warp is white;

(H) forming jacquard with a colored image.

2. The as claimed in claim 1, wherein said basic colors may be changed according to the requirement of weaving so to increase the gray levels and range in order to weave jacquard with a colored effect.

* * * * *